(No Model.)
A. MILLS.
TUBULAR METALLIC POLE FOR TELEGRAPHIC AND OTHER USES.
No. 377,953. Patented Feb. 14, 1888.
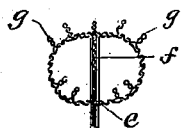
Fig. 1.
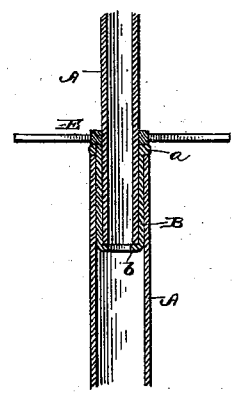
Fig. 4.
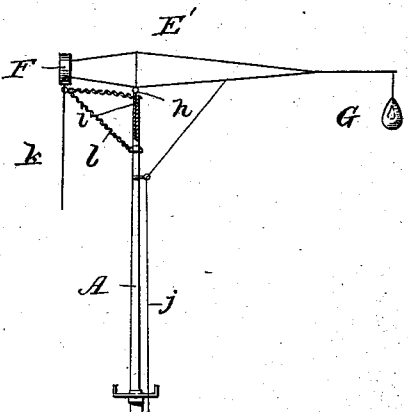
Fig. 2.
Fig. 3.
Fig. 5.
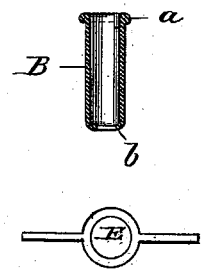
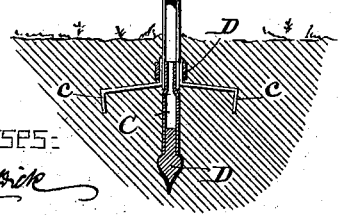
Witnesses:
Inventor:
Anson Mills
by Marcellus Bailey
his Attorney

UNITED STATES PATENT OFFICE.

ANSON MILLS, OF THE UNITED STATES ARMY, ASSIGNOR OF ONE-HALF TO NELSON A. MILES, OF THE UNITED STATES ARMY.

TUBULAR METALLIC POLE FOR TELEGRAPHIC AND OTHER USES.

SPECIFICATION forming part of Letters Patent No. 377,953, dated February 14, 1888.

Application filed March 14, 1887. Serial No. 230,928. (No model.)

*To all whom it may concern:*

Be it known that I, ANSON MILLS, of the United States Army, at present stationed at Fort Grant, in the Territory of Arizona, have invented certain new and useful Improvements in Tubular Metallic Poles for Telegraphic and other Uses, of which the following is a specification.

My invention has relation to a tubular metallic pole designed for general use—for instance, as a telegraph-pole, a column, a staff or mast, a lamp-post, &c.

The pole which I have invented is jointed or made in sections, and my invention is mainly directed to a device for joining the several sections, the object of making the pole in sections being both to facilitate its transportation to the point where it is to be erected and to permit the amount of metal used in each section to be varied (according to the altitude of the section) in proportion to the lateral strain upon it, as in flag-poles, &c., or to the crushing strain upon it, as in building-columns and the like. In forming the joint between the sections the upper end of the lower section is the female and the lower end of the upper section is the male member of the joint. Between these two members I interpose a sleeve, which is inserted in and supported by the lower tubular section and receives and supports the upper section. It is in this feature that my invention mainly is comprised. It affords a strong, convenient, easily-applied, and durable joint between the sections. This and other features of my invention can best be explained and understood by reference to the accompanying drawings, in which—

Figure 1 is a view, partly in section, of a telegraph-pole embodying my invention. Fig. 2 is a like view of a post designed to support an electric or other lamp, and provided with a hinged crane or sweep to which the lamp is attached. Fig. 3 is a view, partly in section, of the sleeve used in joining the sections. Fig. 4 is a longitudinal central section, on an enlarged scale, of the parts which form the joint between adjoining sections. Fig. 5 is a view of one of the cross-trees or saddles.

The pole is composed of several lengths or sections, A, of metal pipe or tubing. The lowermost section is of greater diameter than the others, and each section successively is of less diameter than the one below it. In joining them the lower end of the smaller section is inserted into the upper end of the larger one. These tubes or sections may be made as ordinary iron pipe for water or gas; but preferably they will be made of tempered steel, especially when the pole is to be of considerable height or is required to withstand great strain.

The pipe is rolled and welded as usual and each section cut squarely off in the exact length required, and while hot their ends are swaged and pressed on mandrels with dies and rolls into the exact forms required for the joints. The female portion of the joint is swaged, so that its interior diameter shall be so near the exterior diameter of the male part of the joint as to barely leave room between the two for a metallic sleeve, B, which preferably has a length about equal to twice the exterior diameter of the female part of the joint and a thickness sufficient to bear the weight of the superincumbent structure. The top of this sleeve has upon it an external flange, $a$. On its bottom or lower end is an internal flange, $b$. The outer flange, $a$, rests upon the top of the female part of the joint, and thus supports the sleeve in position. The inner flange, $b$, supports the male part of the joint, which is inserted in the sleeve and rests upon the flange $b$. Both male and female parts of the joint, as well as the sleeve, if desired, may be swaged or formed with a slight taper, so that they can be driven together firmly and tightly, and, if need be, the parts can be warmed or heated at the time they are fitted together, so that they may in cooling contract, and thus be more closely united. The advantages of this joint are that it is easily and conveniently made and is very strong and durable, affording an increased amount of metal at those points where it is most required.

In order to enable the pole, when set in the ground, to withstand lateral strain, which is always greatest at or near the ground-line, I prefer that the lowermost section A shall enter the ground about twelve inches, and that a tubular metallic sub-section, C, shall enter it from below, closely fitting into it for about one-quarter of its length, and extending thence into the ground from three to eight feet, depending upon the height of the pole and the strain upon it. For a length of about twelve inches at its lower end the lowermost section A has a slight taper, being widest at the base. On this part are applied anchoring-tangs c, which are held in place by a strong metallic ring, d, which is driven down over their feet, which rest against the section A.

Into the lower end of the sub-section C may be inserted a wooden plug, D, to add to rigidity. At each joint, as indicated in Fig. 1, there may be a metallic cross-tree or saddle, E, consisting, as shown, of a collar which closely fits the upper section and rests upon the top of the sleeve B, said collar being provided with diametrically-opposite foot-rests. These cross-trees are to facilitate the climbing of the pole, being intended to receive the hooks of a light ladder, which, as the person ascends the pole, can, when he reaches one cross-tree, be pulled up and then hooked upon the cross-tree next above.

When the pole is used for a telegraph-pole, the frame which supports the insulators can be mounted and held in place by being provided with a spindle or stem, which is inserted and fitted into the top of the uppermost tubular section.

Such a frame as indicated in Fig. 1 can be conveniently made of wire doubled and twisted and bent into loop shape, the wires being so bent and twisted as to form on the bottom of the hoop a collar, e, to slip over and down upon the upper section A, which it closely surrounds, and on the top of the hoop, just over and in line with the collar e, has a stem or spindle, f, to enter and fit closely in the top of the said tubular section. The pins g, for holding the glass insulators, can be formed by taking out loops of one of the wires at intervals and twisting these loops into the shape of short stems or pins.

In using the pole as a lamp-post for supporting an electric or other lamp I prefer to make use of the device shown in Fig. 2, consisting of a skeleton frame or sweep, E', which is jointed at h to the stem or spindle i, which enters and fits in the top of the pole. This sweep is weighted at F, so that the end which carries the lamp G will be normally lifted into the position it is intended to occupy. A cord or rope, j, fastened to the lamp end of the sweep and passing thence through suitable guide-eyes to the ground, constitutes the means by which this end of the sweep can be pulled down, so as to allow the attendant to trim or care for the lamp. The weight F will serve to carry the sweep back into its original position.

In order to support the sweep against torsional strain, a guide and stay-rod, k, can be hinged to the weighted end and pass down through a guide, l, fixed firmly to the upper end of the post.

Having described my improvements and the manner in which the same are or may be carried into effect, what I claim is as follows:

1. The combination, with the tubular metallic pole-sections, of the internally and externally flanged sleeve B, interposed between the male and female parts of the joints connecting said sections, the arrangement being such that the joint is composed of the three concentric thicknesses of metal of the two sections and the intermediate joint-sleeve, substantially as and for the purposes hereinbefore set forth.

2. In combination with the sections and the interposed sleeve B, the cross-tree or saddle having a collar which fits the upper section and rests upon the head of the sleeve, as and for the purposes hereinbefore set forth.

In testimony whereof I have hereunto set my hand this 2d day of March, 1887.

ANSON MILLS.

Witnesses:
 EWELL A. DICK,
 MARVIN A. CUSTIS.